(12) United States Patent
Uchiike et al.

(10) Patent No.: US 10,219,352 B2
(45) Date of Patent: Feb. 26, 2019

(54) LIGHT-EMITTING APPARATUS AND DISPLAY APPARATUS

(71) Applicant: CANON KABUSHIKI KAISHA, Tokyo (JP)

(72) Inventors: Hiroshi Uchiike, Fujisawa (JP); Yasuhiro Matsuura, Yokohama (JP); Mitsuru Tada, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/664,181

(22) Filed: Jul. 31, 2017

(65) Prior Publication Data

US 2018/0042088 A1 Feb. 8, 2018

(30) Foreign Application Priority Data

Aug. 4, 2016 (JP) .................. 2016-153459

(51) Int. Cl.
*H05B 37/02* (2006.01)
*G01J 1/44* (2006.01)
*G09G 3/34* (2006.01)
*H05B 33/08* (2006.01)

(52) U.S. Cl.
CPC ............ *H05B 37/0227* (2013.01); *G01J 1/44* (2013.01); *G09G 3/3406* (2013.01); *H05B 33/0869* (2013.01); *H05B 33/0872* (2013.01); *G01J 2001/444* (2013.01); *G09G 2320/041* (2013.01); *G09G 2320/0626* (2013.01); *G09G 2360/14* (2013.01); *G09G 2360/145* (2013.01)

(58) Field of Classification Search
CPC ....... G09G 2360/145; G09G 2320/041; G09G 2320/0233; G09G 2320/064; G09G 3/3406; G09G 3/3426; G09G 2310/024; G09G 2320/0626; G09G 2330/12; G09G 3/2088; G09G 3/342; G09G 3/36; G09G 3/3611
USPC ....... 315/151, 158, 291, 294, 297, 307, 308, 315/312, 323
See application file for complete search history.

(56) References Cited

U.S. PATENT DOCUMENTS

2009/0167194 A1* 7/2009 Mizuta .................. G09G 3/2088
   315/151
2012/0286674 A1* 11/2012 Takanashi .......... H05B 33/0869
   315/158

(Continued)

FOREIGN PATENT DOCUMENTS

JP  2014-241277 A  12/2014

*Primary Examiner* — Douglas W Owens
*Assistant Examiner* — Wei Chan
(74) *Attorney, Agent, or Firm* — Cowan, Liebowitz & Latman, P.C.

(57) ABSTRACT

A light-emitting apparatus includes: a light source unit; an optical sensor configured to acquire a light detection value corresponding to light emitted from the light source unit; a temperature sensor configured to acquire a temperature detection value corresponding to temperature of the optical sensor; and a correction unit configured to execute switching between first processing to acquire a current corrected detection value by correcting a current light detection value, based on a current temperature detection value, and second processing to acquire a current corrected detection value, based on: 1) at least one of a past light detection value and a past corrected detection value; 2) a past temperature detection value; and 3) the current temperature detection value.

17 Claims, 7 Drawing Sheets

(56) References Cited

U.S. PATENT DOCUMENTS

| | | | | |
|---|---|---|---|---|
| 2013/0181612 A1* | 7/2013 | Ohno | ............... | H05B 37/02 |
| | | | | 315/151 |
| 2013/0181961 A1* | 7/2013 | Fujinaka | ............... | G09G 3/36 |
| | | | | 345/207 |
| 2014/0098079 A1* | 4/2014 | Takayanagi | ............... | G06F 3/1423 |
| | | | | 345/207 |

* cited by examiner

LIGHT-EMITTING APPARATUS AND DISPLAY APPARATUS

BACKGROUND OF THE INVENTION

Field of the Invention

The present invention relates to a light-emitting apparatus and a display apparatus.

Description of the Related Art

"Local diming control" is a control used for a liquid crystal display apparatus. With the local diming control, light emission brightness values (light emission amount) of a plurality of light source units of a backlight unit are individually controlled based on the image data. By performing the local diming control, the contrast of the display image (image displayed on screen) can be improved.

In a case where the local diming control is performed, the dispersion of the degree of deterioration in each light source unit, the dispersion of temperature in each light source unit and the like are generated among the plurality of light source units. And the light from each light source unit depends on the degree of deterioration of the light source unit, the temperature of the light source unit and the like. Therefore in order to obtain a desired light from each light source unit, light from the light source unit is detected and the light emission of the light source unit must be controlled based on the detection value of the light from the light source unit.

Figure 6:
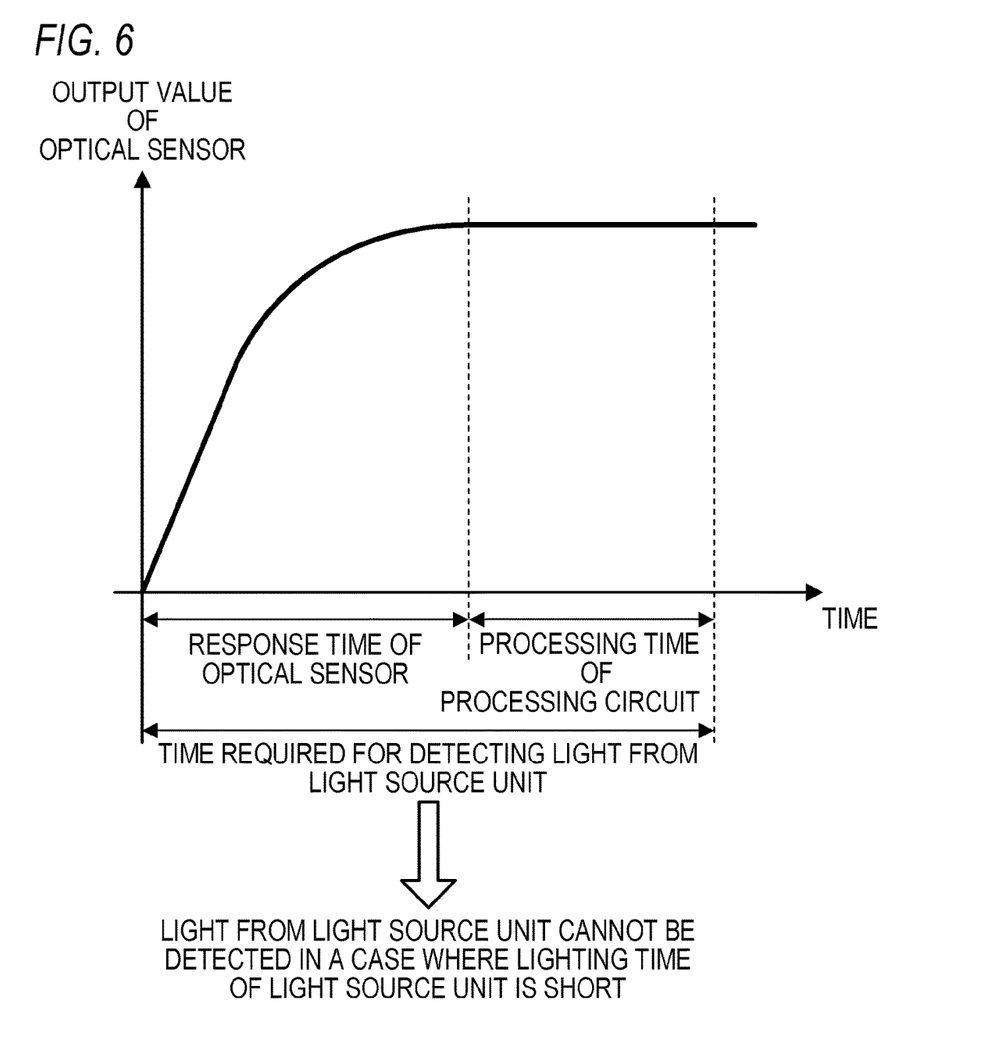
FIG. 6 is a diagram depicting an example of the time required for detecting light from the light source unit.

To detect light from each light source unit, the light source unit must be continuously lit for a predetermined time or more. This predetermined time is, for example, the total of the response time of the optical sensor which detects light from the light source unit and the processing time of the processing circuit (e.g. microcomputer), which processes the output signal of the optical sensor, as depicted in FIG. 6. In concrete terms, the circuits of the optical sensor includes a resistor, a capacitor, an operational amplifier and the like, and the response time of the optical sensor includes the response time of the resistor, the response time of the capacitor, the response time of the operational amplifier and the like. The response time of the optical sensor can be defined as the "time required for the optical sensor to charge light", or can be defined as the "time required for saturation of the detection value of the optical sensor" The processing time of the processing circuit is, in concrete terms, the time required for A/D conversion processing to convert the output signal (analog signal) of the optical sensor into a digital signal.

Figure 7:
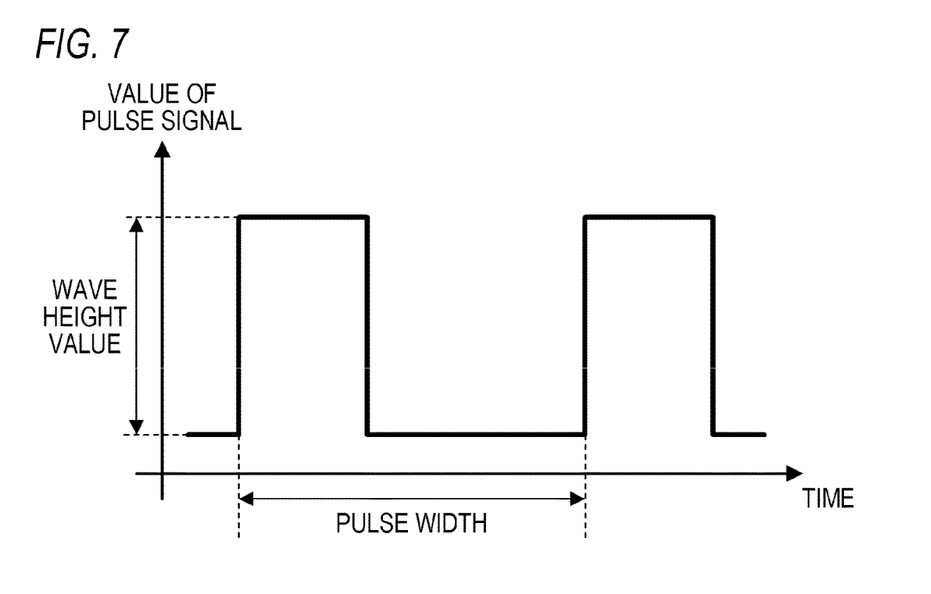
FIG. 7 is a diagram depicting an example of a pulse signal which is input to the light source unit.

Now a case where a pulse signal, depicted in FIG. 7, is input to a light source unit and the light source unit emits light in accordance with the pulse signal, is considered. In this case, a value corresponding to the wave height value of the pulse signal (pulse amplitude) is acquired as the detection value of the optical sensor (detection value corresponding to the emission brightness of the light source unit). If a change in the degree of age deterioration of the light source unit, a change in the temperature of the light source unit and the like are not generated, and a predetermined time or longer lighting period (pulse width of the pulse signal) is set, the same value (value which does not depend on the lighting period) can always be acquired as the detection value of the optical sensor.

A prior art on the detection of light from the light source unit is disclosed, for example, in Japanese Patent Application Laid-Open No. 2014-241277. According to the technique disclosed in Japanese Patent Application Laid-Open No. 2014-241277, one frame period of the image data is divided into a plurality of sub-frame periods. Then for each of the plurality of frame periods, the lighting period of the backlight unit is independently set so that the blinking sensation of the backlight unit is reduced, and a lighting period, not less than a predetermined time, can be ensured. In concrete terms, in a case where the lighting period of a certain sub-frame is increased, the lighting period in the other sub-frames is decreased.

However, even if such a prior art as the technique disclosed in Japanese Patent Application Laid-Open No. 2014-241277 is used, light from the light source unit may not be detected (the detection value of the light from the light source unit may not be acquired).

For example, display apparatuses which can display images having a wide dynamic range are now receiving attention. The wide dynamic range is called "High Dynamic Range (HDR)", an image having a wide dynamic range is called an "HDR image", and a display apparatus that can display an HDR image is called an "HDR display apparatus". In the HDR display apparatus, not only is the display brightness of white (brightness on screen) increased, but the display brightness of black is decreased as well. In order to decrease the display brightness of black, the lighting of the backlight unit is turned OFF, or the light emission brightness of the backlight unit is controlled to be a very low light emission brightness. Therefore a sufficiently long lighting period may not be ensured while maintaining the display brightness of black. As a result, light from the light source unit may not be detected.

Further, in recent years, a number of light source units included in a display apparatus is increasing to improve the contrast of the display image. By increasing the number of light source units, the time required for processing to individually detect the light from each light source unit increases. Therefore if a number of light source units is large, the temperature of the light source units changes before the detection of the lights from all the light source units completes, and the accuracy of the detection values drops.

SUMMARY OF THE INVENTION

The present invention in its first aspect provides a light-emitting apparatus, comprising:

a light source unit;

an optical sensor configured to acquire a light detection value corresponding to at least one of a brightness and a color of light emitted from the light source unit;

a temperature sensor configured to acquire a temperature detection value corresponding to temperature of the optical sensor; and a correction unit configured to execute switching between first processing to acquire a current corrected detection value by correcting a current light detection value, based on a current temperature detection value, and second processing to acquire a current corrected detection value, based on: 1) at least one of a past light detection value and a past corrected detection value; 2) a past temperature detection value; and 3) the current temperature detection value.

The present invention in its second aspect provides a display apparatus, comprising:

the light-emitting apparatus corresponding to the first aspect of the present invention; and a display unit configured to display an image by modulating light emitted from the light-emitting apparatus.

The present invention in its third aspect provides a method for controlling a light-emitting apparatus having:

having:
  a light source unit;
  an optical sensor configured to acquire a light detection value corresponding to at least one of a brightness and a color of light emitted from the light source unit; and
  a temperature sensor configured to acquire a temperature detection value corresponding to temperature of the optical sensor,
  the method comprising:
  a correction step of executing switching between
  first processing to acquire a current corrected detection value by correcting a current light detection value, based on a current temperature detection value, and
  second processing to acquire a current corrected detection value, based on: 1) at least one of a past light detection value and a past corrected detection value; 2) a past temperature detection value; and 3) the current temperature detection value.

The present invention in its fourth aspect provides a non-transitory computer readable medium that stores a program, wherein
  the program causes a computer to execute a method for controlling a light-emitting apparatus having:
  a light source unit;
  an optical sensor configured to acquire a light detection value corresponding to at least one of a brightness and a color of light emitted from the light source unit; and
  a temperature sensor configured to acquire a temperature detection value corresponding to temperature of the optical sensor,
  the method comprising:
  a correction step of executing switching between
  first processing to acquire a current corrected detection value by correcting a current light detection value, based on a current temperature detection value, and
  second processing to acquire a current corrected detection value, based on: 1) at least one of a past light detection value and a past corrected detection value; 2) a past temperature detection value; and 3) the current temperature detection value.

Further features of the present invention will become apparent from the following description of exemplary embodiments with reference to the attached drawings.

DESCRIPTION OF THE EMBODIMENTS

EXAMPLE 1

Example 1 of this invention will be described. A light-emitting apparatus according to Example 1 can be used as a backlight unit for a transmissive liquid crystal display apparatus, for example.

The light-emitting apparatus according to Example 1 is not limited to a backlight unit. The light-emitting apparatus according to Example 1 can be used for any display apparatus as long as the display apparatus includes a display unit configured to display an image by modulating the light emitted from the light-emitting apparatus. For example, the light-emitting apparatus according to Example 1 can be used for a reflective liquid crystal display apparatus. The light-emitting apparatus according to Example 1 can also be used for a microelectromechanical systems (MEMS) shutter type display apparatus using MEMS shutters instead of liquid crystal elements.

The light-emitting apparatus according to Example 1 can also be used for such a display apparatus as an advertisement signboard unit and a sign display unit. The light-emitting apparatus according to Example 1 can also be used as an illumination apparatus for street lighting, indoor illumination, microscope illumination and the like.

Figure 1:
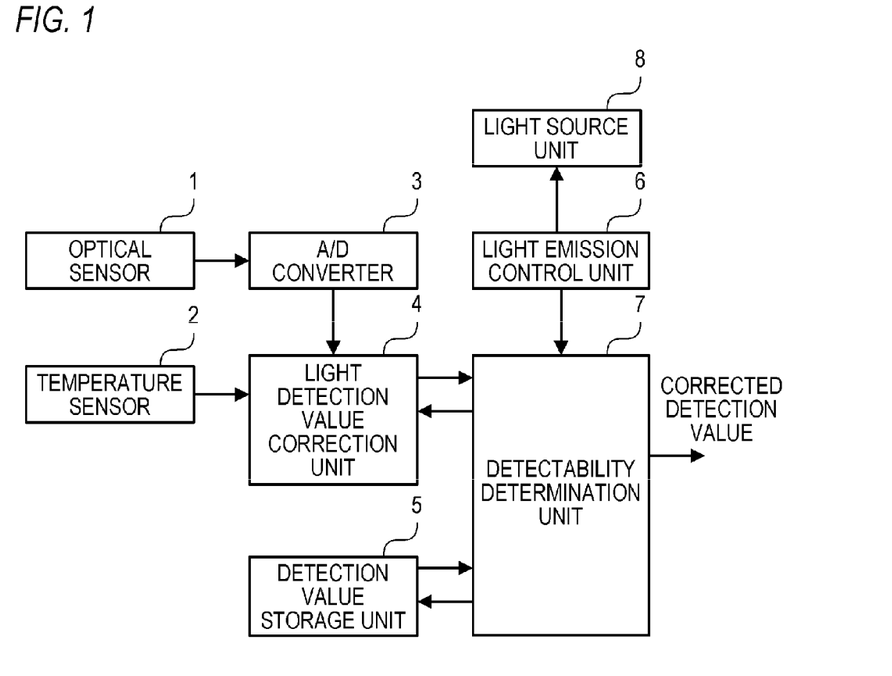
FIG. 1 is a block diagram depicting a configuration example of a light-emitting apparatus according to Example 1.

FIG. 1 is a block diagram depicting a configuration example of the light-emitting apparatus according to Example 1. Each functional unit of the light-emitting apparatus according to Example 1 will be described with reference to FIG. 1.

A light source unit 8 emits light. The light source unit 8 has one or more light sources (light-emitting elements) which emit light. For the light source, a light-emitting diode, an organic EL element, a cold cathode tube or the like can be used.

An optical sensor 1 detects (measures) the light emitted from the light source unit 8, and acquires a light detection value (result of detecting light emitted from the light source unit 8). The optical sensor 1 outputs the light detection value to an A/D converter 3. In Example 1, the optical sensor 1 detects the brightness of the light emitted from the light source unit 8. As the optical sensor 1, a sensor to detect a color of the light emitted from the light source unit 8, a sensor to detect the brightness and color of the light emitted from the light source unit 8 or the like may be used.

A temperature sensor 2 detects a temperature corresponding to the optical sensor 1 (temperature that is approximately the same as the temperature of the optical sensor 1), and acquires the temperature detection value (result of detecting the temperature corresponding to the optical sensor 1). The temperature sensor 2 outputs the temperature detection value to a light detection value correction unit 4. The phrase "approximately the same" includes the meaning "exactly the same". For example, the temperature sensor 2 is disposed near the optical sensor 1. The temperature detection value is used to reduce the change in the light detection value caused by the temperature change of the optical sensor 1. In concrete terms, the optical sensor 1 has a temperature characteristic in which "the relative relationship of the light emitted from the light source unit 8 and the light detection value depends on the temperature of the optical sensor 1". The temperature detection value is used to reduce the change of this relative relationship caused by the temperature change of the optical sensor 1.

The optical sensor 1 outputs an analog light detection value to an A/D converter 3. The A/D converter 3 converts the analog value, output from the optical sensor 1, into a digital value. Thereby a digital light detection value is acquired. The A/D converter 3 outputs the digital light detection value to a light detection value correction unit 4.

The light detection value correction unit 4 corrects the light detection value output from the A/D converter 3 based on the temperature detection value output from the temperature sensor 2, so as to reduce the change in the light detection value caused by the temperature change of the optical sensor 1, whereby a corrected detection value is acquired. The corrected detection value is a light detection value after correction. Hereafter, a light detection value before correction is called a "light detection value", and a light detection value after correction is called a "corrected detection value". The light detection value correction unit 4 outputs the corrected detection value to a component outside the light-emitting apparatus, a predetermined functional unit and the like. The corrected detection value is used for controlling light emission (e.g. light emission brightness, light emission color) of the light source unit 8, for example. In Example 1, the corrected detection value is output from the light detection value correction unit 4 to a component outside the light-emitting apparatus, a predetermined functional unit and the like via a light detectability determination unit 7. The corrected detection value may be output from the light detection value correction unit 4 to a component outside the light-emitting apparatus, a predetermined functional unit and the like directly without passing through the light detectability determination unit 7.

The light detection value correction unit 4 also records the temperature detection value, output from the temperature sensor 2, and the corrected detection value to a detection value storage unit 5. In Example 1, the light detection value correction unit 4 records the detection value in the detection value storage unit 5 via the light detectability determination unit 7. The light detection value correction unit 4 may record the detection value in the detection value storage unit 5 directly without passing through the light detectability determination unit 7. For the detection value storage unit 5, a semiconductor memory, a magnetic disk, an optical disk or the like can be used. The detection value storage unit 5 may be included in the light-emitting apparatus, or attached to the light-emitting apparatus as a removable unit.

A light emission control unit 6 controls the light emission of the light source unit 8 by outputting a drive signal, which is used to drive the light source unit 8, to the light source unit 8. The light emission control unit 6 also outputs the information on the light emission state (light emission information) of the light source unit 8 to the light detectability determination unit 7. In Example 1, a pulse signal is used as the drive signal, and PWM control, in which light emission (e.g. light emission amount, one lighting period) of the light source unit 8 is changed by changing the pulse width of the pulse signal, is performed. For the light emission information, a PWM value, which indicates a pulse width, is used. The drive signal, the light emission control method of the light source unit 8, the light emission information and the like are not especially limited. For example, the light emission of the light source unit 8 can be changed by changing the pulse amplitude of the pulse signal, which is used as the drive signal.

The light detectability determination unit 7 determines whether or not the light emitted from the light source unit 8 is detectable, based on the light emission state of the light source unit 8. In concrete terms, the light detectability determination unit 7 determines whether or not the light emitted from the light source unit 8 is detectable, based on the light emission information (PWM value) output from the light emission control unit 6. Then the light detectability determination unit 7 outputs the determination result, on whether or not the light emitted from the light source unit 8 is detectable, to the light detection value correction unit 4.

The method to determine whether or not the light emitted from the light source unit 8 is detectable is not especially limited. In Example 1, the light detectability determination unit 7 determines that "light emitted from the light source unit 8 is detectable" in a case where the PWM value (one lighting period of the light source unit 8) is a threshold or more. If the PWM value is less than the threshold, the light detectability determination unit 7 determines that "light emitted from the light source unit 8 is not detectable". This threshold may be a fixed value determined by the manufacturer in advance, or may be a value which the user can change.

In this example, the light detection value correction unit 4 switches between following first processing and following second processing, and executes the selected processing. In concrete terms, the light detection value correction unit 4 executes the first processing in a case where the light detectability determination unit 7 determines that "light emitted from the light source unit 8 is detectable". On the other hand, the light detection value correction unit 4 executes the second processing in a case where the light detectability determination unit 7 determines that "light emitted from the light source unit 8 is not detectable". The "past corrected detection value" and the "past temperature detection value" correspond to each other. In concrete terms, the "past corrected detection value" is a corrected detection value acquired by using the "past temperature detection value". In other words, the "past temperature detection value" is a temperature detection value used for acquiring the "past corrected detection value".

First processing: A processing to acquire a current corrected detection value by correcting the current light detection value based on the current temperature detection value.

Second processing: A processing to read a past corrected detection value and a past temperature detection value from the detection value storage unit 5, and acquire a current corrected detection value based on the past detection values which were read, and the current temperature detection value.

In this example, the light detection value correction unit 4 reads the past detection value from the detection value storage unit 5 via the light detectability determination unit 7. The light detection value correction unit 4 may read the past detection value from the detection value storage unit 5 directly, without passing through the light detectability determination unit 7.

The timing to switch the processing between the first processing and the second processing is not especially limited. For example, the processing may be switched according to a user's instruction, or the first processing and the second processing may be executed alternately. The light-emitting apparatus may not include the light emission control unit 6, and the light emission state (drive signal) of the light source unit 8 may be fixed. For example, one lighting period of the light source unit 8 may be fixed to a time not less than the threshold. If the timing to switching the processing does not depend on the determination result of the light detectability determination unit 7, the light-emitting apparatus need not include the light detectability determination unit 7, the light emission control unit 6 and the like.

A number of light source units 8 is not especially limited. The light-emitting apparatus may include only one light source unit 8, or may include a plurality of light source units 8. In the case where the light-emitting apparatus includes a plurality of light source units 8, the processing of each functional unit in FIG. 1 is independently executed for each of the plurality of light source units 8. Further, in the case where the light-emitting apparatus includes a plurality of light source units 8, the processing of each functional unit in FIG. 1 may be executed only for a part of the plurality of light source units 8. The light-emitting apparatus may include a plurality of optical sensors 1, or may include a plurality of temperature sensors 2. The light source units 8 and the optical sensors 1 may be corresponded one-to-one, or may be corresponded one-to-a-plurality, or a plurality-to-one. The optical sensors 1 and the temperature sensors 2 may be corresponded one-to-one, or may be corresponded one-to-a-plurality, or a plurality-to-one.

Figure 2:
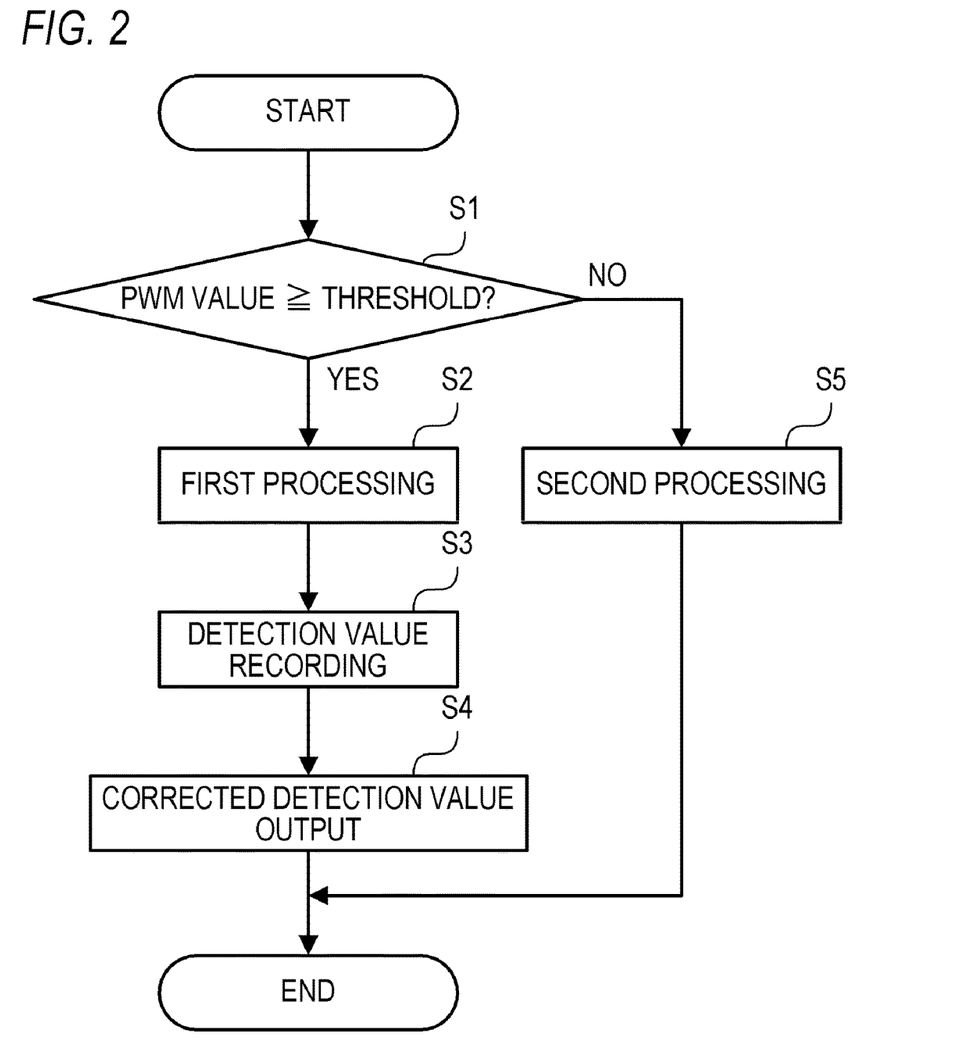
FIG. 2 is a flow chart depicting an example of the processing flow of the light-emitting apparatus according to Example 1.

FIG. 2 is a flow chart depicting an example of the processing flow of the light-emitting apparatus according to Example 1. The processing flow of the light-emitting apparatus according to Example 1 will be described with reference to FIG. 2. If the light-emitting apparatus has only one light source unit 8, this light source unit 8 is selected as a processing target of the processing flow in FIG. 2. If the light-emitting apparatus has a plurality of light source units 8, each of the plurality of light source units 8 is sequentially selected as a processing target of the processing flow in FIG. 2.

First in S1, the light detectability determination unit 7 acquires the PWM value corresponding to the processing target light source unit 8 (target light source unit) from the light emission control unit 6, and compares the acquired PWM value with a threshold. If the acquired PWM value (one lighting period of the target light source unit) is not less than the threshold, the light detectability determination unit 7 determines that "light emitted from the target light source unit is detectable" Then processing advances to S2, and the processing operations in S2 to S4 are executed. If the acquired PWM value is less than the threshold, the light detectability determination unit 7 determines that "light emitted from the target light source unit is not detectable". Then processing advances to S5, and the processing in S5 is executed.

In S2, the light detection value correction unit 4 executes the first processing. In concrete terms, in S2, the optical sensor 1 detects the brightness of the light emitted from the target light source unit, and outputs the current light detection value (analog value) to the A/D converter 3. Then the A/D converter 3 converts the analog value output from the optical sensor 1 into a digital value, and outputs the acquired digital value (current light detection value) to the light detection value correction unit 4. Further, the temperature sensor 2 detects the temperature corresponding to the optical sensor 1 (optical sensor 1 which detects the brightness of the light emitted from the target light source unit), and outputs the current temperature detection value to the light detection value correction unit 4. Then the light detection value correction unit 4 corrects the current light detection value based on the current temperature detection value, whereby the current corrected detection value is acquired.

If the light-emitting apparatus has a plurality of light source units 8, the light emission control unit 6 may turn only the target light source unit ON, or may turn the light source units 8 at the periphery of the target light source unit OFF (e.g. light source units 8 of which distance from the target light source unit is not more than a threshold). Then in this lighting state, the optical sensor 1 may detect the brightness of the light emitted from the target light source unit.

Figure 3:
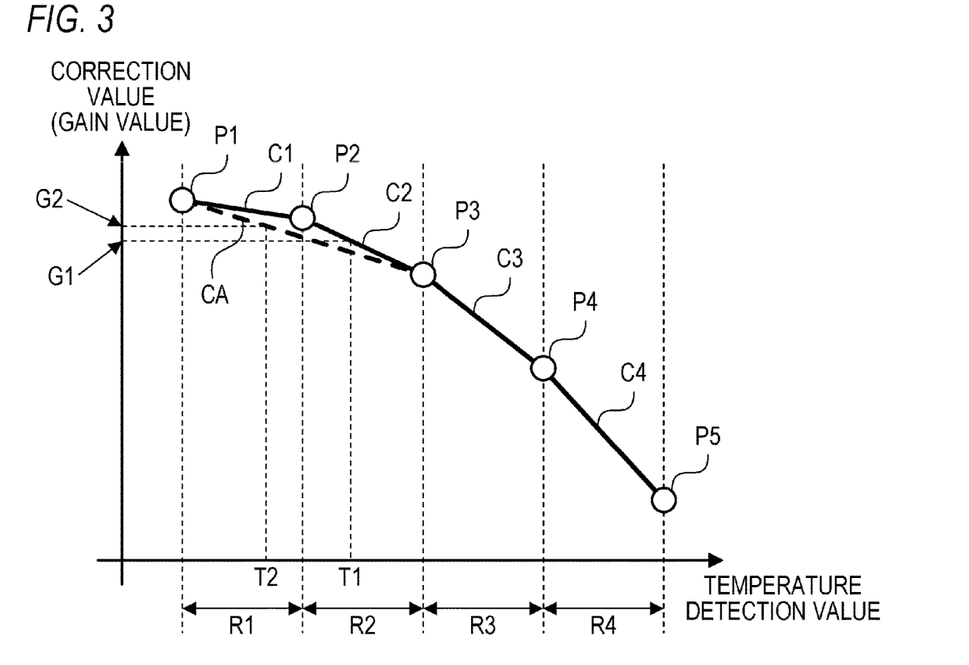
FIG. 3 is a diagram depicting an example of the correction relation and the temperature detection range according to Example 1.

Although a concrete method of the first processing is not especially limited, in Example 1, the following processing is executed as the first processing. As depicted in FIG. 3, in Example 1, a plurality of correspondence relations, which correspond to a plurality of ranges of the temperature detection values (temperature detection ranges) respectively, are determined as the correspondence relation (correction relation) between the temperature detection value and the correction value to correct the light detection value. In concrete terms, a plurality of functions (functions to indicate a correction relation), which correspond to a plurality of correction relations respectively, are recorded in advance in a storage unit (omitted in FIG. 3). In FIG. 3, a plurality of correction relations C1 to C4, which correspond to four temperature detection ranges R1 to R4 respectively, are depicted. A number of temperature detection ranges may be more than four or less than four. In the same manner, a number of correction relations may also be more than four or less than four.

The light detection value correction unit 4 determines a correction value corresponding to the current temperature detection value in accordance with to the correction relation corresponding to the current temperature detection value. Now a case where the current temperature detection value is the temperature detection value T1 in FIG. 3 is considered. The temperature detection value T1 is included in the temperature detection range R2. In this case, the correction value G1 in FIG. 3 is determined as the correction value corresponding to the temperature detection value T1 in accordance with the correction relation C2 corresponding to the temperature detection range R2.

The light detection value correction unit 4 acquires a current corrected detection value by correcting the current light detection value using the determined correction value. In Example 1, a gain value, by which the light detection value is multiplied, is used as the correction value. The light detection value correction unit 4 calculates the current corrected detection value by multiplying the current light detection value by the determined gain value.

The method of determining the correction value corresponding to the current temperature detection value is not especially limited. For example, a table, which indicates a plurality of representative temperature detection values, and a plurality of correction values corresponding to the plurality of temperature detection values respectively, may be recorded in the storage unit (omitted in FIG. 3) in advance. Then a plurality of correction relations, a correction value corresponding to the current temperature detection value and the like may be determined by interpolation processing (e.g. linear interpolation) using the temperature detection values and the correction values indicated in a table.

In FIG. 3, five representative points P1 to P5 are depicted as representative points, and each representative point is a combination of a representative temperature detection value and a correction value corresponding to the temperature detection value. The five representative points P1 to P5 correspond to five temperature detection values, each of which are an upper limit or a lower limit of the temperature detection range. However, the representative temperature detection values, a number of representative points and the like are not especially limited. For example, a plurality of temperature detection values, to divide one temperature detection range into a plurality of ranges, may be used as the representative temperature detection values. A number of representative points may be more than five or less than five.

The correction value is not limited to the gain value. For example, an offset value, which is added to the light detection value, may be used as the correction value. FIG. 3 indicates the correction relation in a case where the correction value linearly changes with respect to the change of the temperature detection value, but the correction relation is not limited to this. For example, the correspondence relation, in a case where the correction value nonlinearly changes with respect to the change of the temperature detection value, may be used as the correction relation.

After S2, the light detection value correction unit 4 records the current corrected detection value and the current temperature detection value in the detection value storage unit 5 via the light detectability determination unit 7 in S3. Then processing advances to S4. In S4, the light detection value correction unit 4 outputs the current corrected detection value to a component outside the light-emitting apparatus, a predetermined functional unit and the like via the light detectability determination unit 7. The processing in S4 may be executed before the processing in S3, or the processing in S3 and the processing in S4 may be executed in parallel.

In S5, the light detection value correction unit 4 executes the second processing. In concrete terms, in S5 the temperature sensor 2 detects the temperature corresponding to the optical sensor 1 (optical sensor 1 which detects the brightness of the light emitted from the target light source unit), and outputs the current temperature detection value to the light detection value correction unit 4. The optical sensor 1 omits the processing to detect the brightness of the light emitted from the target light source unit. The light detection value correction unit 4 reads the previous corrected detection value and the previous temperature detection value from the detection value storage unit 5 via the light detectability determination unit 7. Then the light detection value correction unit 4 acquires the current corrected detection value based on the previous corrected detection value, the previous temperature detection value, and the current temperature detection value.

In the case where the light-emitting apparatus includes a plurality of light source units 8 and the processing by the optical sensor 1 is omitted, the light emission control unit 6 may omit the processing to turn only the target light source unit ON, the processing to turn the light source units 8 at the periphery of the target light source unit OFF and the like.

The concrete method for the second processing is not especially limited, but in Example 1, the following processing is executed as the second processing.

The light detection value correction unit 4 inversely calculates the previous light detection value based on the previous temperature detection value and the previous corrected detection value. In concrete terms, the light detection value correction unit 4 determines a gain value (previous gain value) corresponding to the previous temperature detection value, in accordance with the correction relation corresponding to the previous temperature detection value. Then the light detection value correction unit 4 calculates the previous light detection value by dividing the previous corrected detection value by the previous gain value.

Then the light detection value correction unit 4 determines the gain value corresponding to the current temperature detection value in accordance with the approximate relation approximating a correction relation corresponding to the previous temperature detection value and the correction relation corresponding to the current temperature detection value. Now a case where the previous temperature detection value is the temperature detection value T1 in FIG. 3, and the current temperature detection value is the temperature detection value T2 in FIG. 3, is considered. The temperature detection value T1 is included in the temperature detection range R2, and the temperature detection value T2 is included in the temperature detection range R1. In this case, the gain value G2 in FIG. 3 is determined as the gain value corresponding to the current temperature detection value T2 in accordance with the approximate relation CA in FIG. 3. The approximate relation CA is an approximate relation to approximate the correction relation C1 corresponding to the temperature detection range R1 and the correction relation C2 corresponding to the temperature detection range R2, and the function of the approximate relation CA is a linear function that passes through the representative point P1 and the representative point P2.

Then the light detection value correction unit 4 acquires (calculates) the current corrected detection value by multiplying the previous light detection value by the determined gain value (gain value corresponding to the current temperature detection value).

If the temperature change of the target light source unit, the temperature change of the optical sensor 1 or the like is not generated, a constant light detection value (approximately the same plurality of light detection values) can be acquired for a short period of time. Therefore a current corrected detection value can be acquired (estimated) at high precision by using the previous light detection value, the previous temperature detection value, and the current temperature detection value.

In Example 1, the processing of the optical sensor 1 is omitted in a case where the second processing is executed, but this processing of the optical sensor 1 need not be omitted. However, if the processing of the optical sensor 1 is omitted in a case where the second processing is executed, the processing load of the light-emitting apparatus can be reduced.

In Example 1, the "previous detection value" is used as the "past detection value", but the "past detection value" need not be the "previous detection value". For example, a "detection value randomly selected from a plurality of detection values which were recorded for a predetermined period in the past from the present" may be used as the "past detection value". However, it is preferable that the period from the timing when the "past detection value" was acquired to the present is short.

The method of determining the approximate relation is not especially limited. For example, in the case where the previous temperature detection value is the temperature detection value T1 in FIG. 3 and the current temperature detection value is the temperature detection value T2 in FIG. 3, the function of the approximate relation may be calculated by the least square method using the representative points P1 to P3 in FIG. 3.

The light detection value may be recorded in the detection value storage unit 5. Then in the second processing, the past light detection value may be read from the detection value storage unit 5. In this case, the processing to acquire the past correction value can be omitted, and the processing load can be reduced. One of the corrected detection value and the light detection value may be recorded in the detection value storage unit 5, or both the corrected detection value and the light detection value may be recorded in the detection value storage unit 5. In the second processing, one of the past corrected detection value and the past light detection value may be read from the detection value storage unit 5 and used in a processing, or both the past corrected detection value and the past light detection value may be read from the detection value storage unit 5 and used in a processing.

In Example 1, the detection value is recorded in the detection value storage unit 5 in only case where the first processing is executed, but the present invention is not limited to this. For example, the detection value may be recorded in both a case where the first processing is executed and a case where the second processing is executed. The detection value may be periodically recorded regardless of whether the processing to be executed is the first processing or the second processing. However, in order to improve the accuracy of the second processing, it is preferable that the detection value used in the first processing is used as the "past detection value".

As described above, according to Example 1, the first processing which is suitable to acquire the light detection value at high precision and the second processing, with which the light detection value cannot be acquired at high precision, are switched between and executed. Thereby the corrected detection value at high precision can be acquired with certainty. In concrete terms, the first processing is executed in a case where it is determined that "the light detection value can be acquired", and the second processing is executed in a case where it is determined that the "light detection value cannot be acquired". As a result, a high precision corrected detection value can be acquired in not only case where the light detection value can be acquired, but also a case where the light detection value cannot be acquired.

In the case of a display apparatus including the light-emitting apparatus, the light emission brightness of the light source unit may be reduced to a very low light emission brightness in order to reduce the display brightness of black (brightness on screen). In concrete terms, one lighting period of the light source may be reduced to a very short time. In some cases the light source unit may even be turned OFF. In such cases, the light detection value cannot be acquired. According to Example 1, even in such cases, a high precision corrected detection value can be acquired by the second processing. In other words, even if the display brightness of black is reduced, a high precision corrected detection value can be acquired. Further, by using the corrected detection value for controlling the light emission of the light source unit, the image quality of the displayed image can be improved or maintained regardless of the display brightness.

EXAMPLE 2

Example 2 of this invention will be described. In the following, aspects (configurations and processing operations) which are different from Example 1 will be described in detail, and description on the same aspects as Example 1 will be omitted.

In Example 1, an example of executing the second processing, in a case where it is determined that the light emitted from the light source unit 8 is not detectable, was described. However, in the case where the light-emitting apparatus has a plurality of light source units, the time required for all the processing operations to individually detect the light from each light source unit increases as a number of light source units increases. If there are many light source units of which corrected detection values are acquired in the first processing, it takes a long time until the detection of lights from all the light source units completes. Therefore before the detection of lights from all the light source units completes, the accuracy of the corrected detection value drops. Further, if the corrected detection value is used to control the light emission of the light source units, the image quality of the display image on the display apparatus having the light-emitting apparatus deteriorates.

In the second processing, the detection by the optical sensor 1 is unnecessary, hence the corrected detection value can be acquired more quickly than the first processing. Therefore in Example 2, the second processing is actively performed. Thereby the processing load of the light-emitting apparatus, the processing time of the light-emitting apparatus and the like can be reduced. As a result, a drop in the accuracy of the corrected detection value, a deterioration in the image quality of the display image and the like can be prevented.

Figure 4:
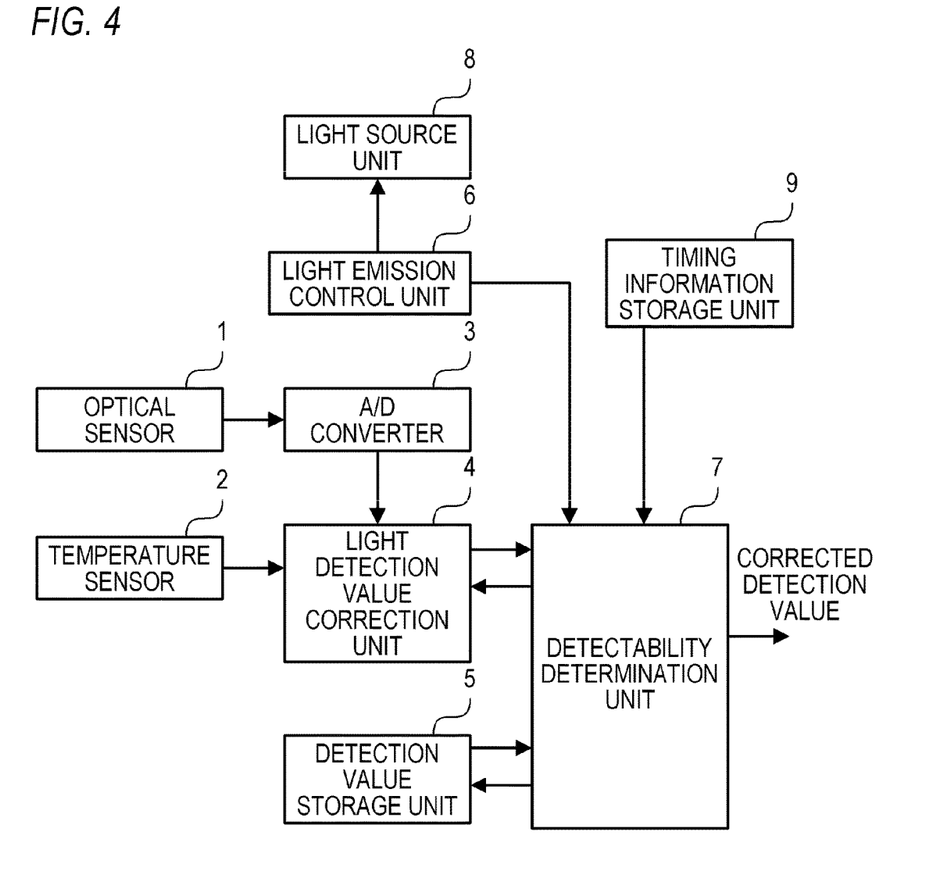
FIG. 4 is a block diagram depicting a configuration example of a light-emitting apparatus according to Example 2.

FIG. 4 is a block diagram depicting a configuration example of the light-emitting apparatus according to Example 2. In FIG. 4, functional units the same as Example 1 (FIG. 1) are denoted with the same reference signs as Example 1. As depicted in FIG. 4, the light-emitting apparatus according to Example 2 further includes a timing information storage unit 9.

In Example 2, a timing to execute the first processing and a timing to execute the second processing are predetermined. In concrete terms, information on the timing to execute the first processing and the timing to execute the second processing (timing information) has been stored in the timing information storage unit 9. For the timing information storage unit 9, a semiconductor memory, a magnetic disk, an optical disk or the like can be used. The timing information storage unit 9 may be included in the light-emitting apparatus, or may be attached to the light-emitting apparatus as a removable unit.

The timing to execute the first processing and the timing to execute the second processing are not especially limited. For example, the timing to execute the first processing and the timing to execute the second processing may be determined such that the first processing and the second processing are alternately executed for one light source unit 8. The timing to execute the first processing and the timing to execute the second processing may be determined such that the second processing is executed once after the first processing is executed for a plurality of times for one light source unit 8. The timing to execute the first processing and the timing to execute the second processing may be determined such that the second processing is executed for a plurality of times after the first processing is executed once for one light source unit 8. The timing to execute the first processing and the timing to execute the second processing may be determined such that the second processing is executed for a plurality of times after the first processing is executed for a plurality of times for one light source unit 8.

Now a case where the light-emitting apparatus has a plurality of light source units 8 and a selection processing to sequentially select each of the plurality of light source units 8 as a target light source unit is considered. In this case, the timing to execute the first processing and the timing to execute the second processing are determined for each one of the light source units 8. For example, in a case where the Nth (N is 1 or greater integer) selection processing is executed, the timing may be predetermined such that the first processing is executed for a part of the plurality of light source units 8, and the second processing is executed for the rest of the plurality of light source units 8. Then, in a case where the N+1th selection processing is executed, the timing may be predetermined such that the second processing is executed for part of the plurality of light source units 8, and the first processing is executed for the rest of the plurality of light source units 8. A "part of the plurality of light source units 8" may be, for example, light source units 8 which are selected in an odd numbered order in the selection processing as the target light source unit. And a "part of the plurality of light source units 8" may be, for example, light source units 8 which are selected in an even numbered order in the selection processing as the target light source unit. The timing may be predetermined such that the first processing is executed for all the plurality of light source units 8 in a case where the Nth selection processing is executed, and the second processing is executed for all the plurality of light source units 8 in a case where the N+1th selection processing is executed.

It is preferable that a light source unit 8, which is to receive the first processing, exists at the periphery of a light source unit 8, which is to receive the second processing. For example, it is preferable that a light source unit 8 to receive the first processing exists adjacent to a light source unit 8 to receive the second processing. The corrected detection value acquired in the second processing is an estimated value, hence in some cases the accuracy of the corrected detection value acquired in the second processing may be lower than the accuracy of the corrected detection value acquired in the first processing. If a light source unit 8 to receive the first processing exists at a periphery of a light source unit 8 to receive the second processing, an error of the corrected detection value acquired in the second processing can be less pronounced. In concrete terms, in a case where the light emission of the light source unit 8 is controlled based on the corrected detection value, an error of the light emission of the light source unit 8, for which the second processing was executed, becomes less pronounced by the light emission of the peripheral light source unit 8, for which the first processing was executed.

The timing information is not especially limited. For example, a timing to execute the first processing and a timing to execute the second processing may be used as the timing information. In a case where the light-emitting apparatus has a plurality of light source units 8 and the above mentioned selection processing is repeated, the information to indicate the sequence of selecting each light source unit 8 as a target light source unit may be used as the timing information.

In Example 2, the light detection value correction unit 4 and/or the light detectability determination unit 7 acquire(s) the timing information from the timing information storage unit 9, and determine(s) the timing to execute the first processing and the timing to execute the second processing based on the timing information.

In Example 2, the light detectability determination unit 7 determines whether or not the light emitted from the light source unit 8 is detectable only at the timing to execute the first processing. Since the determination at the timing to execute the second processing (determination whether or not the light emitted from the light source unit 8 is detectable) can be omitted, the processing load of the light detectability determination unit 7 can be reduced. The determination whether or not the light emitted from the light source unit 8 is detectable may be performed at both the timing to execute the first processing and the timing to execute the second processing.

In Example 2, the light detection value correction unit 4 executes the first processing or the second processing considering the timing to execute the first processing and the timing to execute the second processing. For example, the light detection value correction unit 4 executes the first processing at a timing to execute the first processing, and executes the second processing at a timing to execute the second processing. In Example 2, the light detection value correction unit 4 executes the first processing or the second processing at a timing to execute the first processing, depending on the determination result by the light detectability determination unit 7, and executes the second processing at a timing to execute the second processing, regardless of the determination result by the light detectability determination unit 7. In concrete terms, the first processing is executed in a case where it is determined that "light emitted from the light source unit 8 is detectable" at a timing to execute the first processing. The second processing is executed in a case where it is determined that "light emitted from the light source unit 8 is not detectable" at a timing to execute the first processing.

Figure 5:
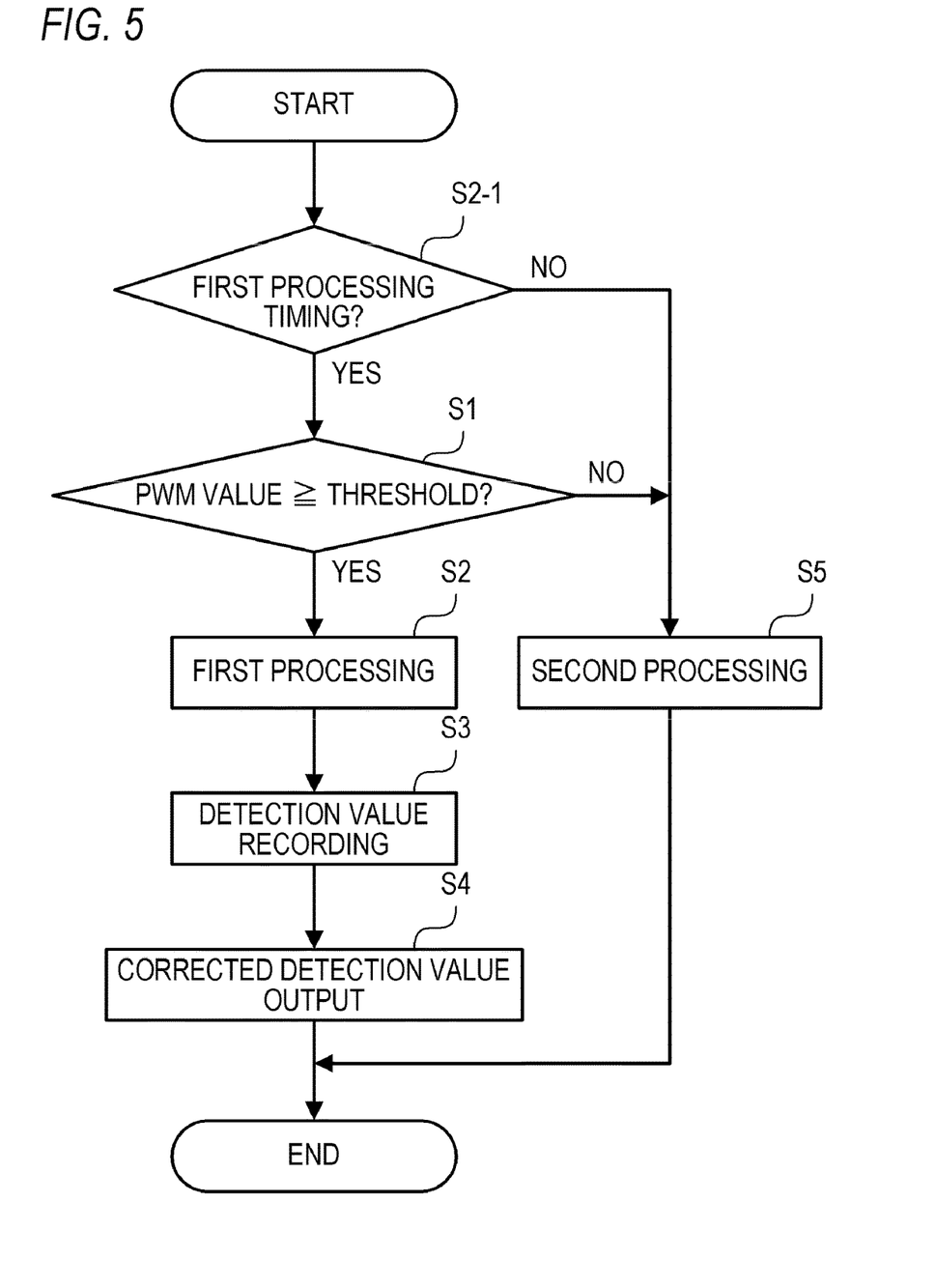
FIG. 5 is a flow chart depicting an example of the processing flow of the light-emitting apparatus according to Example 2.

FIG. 5 is a flow chart depicting an example of the process flow of the light-emitting apparatus according to Example 2. In FIG. 5, a processing the same as Example 1 (FIG. 2) is denoted with the same reference sign as Example 1. As depicted in FIG. 5, the processing in S2-1 is further executed in Example 2. In S2-1, the light detection value correction unit 4 and/or the light detectability determination unit 7 determine(s) whether the current timing is a timing to execute the first processing or a timing to execute the second processing, based on the timing information stored in the timing information storage unit 9. If the current timing is a timing to execute the first processing, processing advances to S1, and a process flow the same as Example 1 is executed. If the current timing is a timing to execute the second processing, processing advances to S5, and the second processing is executed.

As described above, according to Example 2, the second processing is actively performed. Thereby the processing load of the light-emitting apparatus, the processing time of the light-emitting apparatus and the like can be reduced. As a result, a drop in the accuracy of the corrected detection value, the deterioration of image quality of the display image and the like can be prevented.

<OTHER EMBODIMENTS>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-153459, filed on Aug. 4, 2016, which is hereby incorporated by reference herein in its entirety.

What is claimed is:

1. A light-emitting apparatus, comprising:
a light source unit;
a control unit configured to control the light source unit emitting a light by controlling lighting period of the light source unit:
an optical sensor configured to acquire a light detection value corresponding to at least one of a brightness and a color of light emitted from the light source unit;
a temperature sensor disposed near the optical sensor; and
a correction unit configured to execute
a first processing to acquire a current corrected detection value by correcting a current light detection value, based on a current temperature detection value from the temperature sensor if that the lighting period of the light source unit is equal to or more than a threshold, and
a second processing to acquire a current corrected detection value, based on: 1) a past corrected detection value; 2) a past temperature detection value from the temperature sensor; and 3) the current temperature detection value from the temperature sensor if that the lighting period of the light source unit is less than the threshold.

2. The light-emitting apparatus according to claim 1, wherein
in the second processing, the correction unit does not use the current light detection value for acquiring the current corrected detection value.

3. The light-emitting apparatus according to claim 1, wherein the correction unit records: at least one of the light detection value and the corrected detection value; and the temperature detection value, in a storage unit.

4. The light-emitting apparatus according to claim 3, wherein if where the correction unit executes the first processing, the correction unit records: at least one of the light detection value and the corrected detection value; and the temperature detection value, in the storage unit.

5. The light-emitting apparatus according to claim 1, wherein
the past light detection value, the past corrected detection value, and the past temperature detection value are previous detection values.

6. The light-emitting apparatus according to claim 1 wherein
in the second processing, the current corrected detection value is acquired based on the past temperature detection value, the current to temperature detection value, and the past light detection value.

7. light-emitting apparatus according to claim 6, wherein a plurality of correspondence relations, which correspond to a plurality of ranges of the temperature detection value respectively, are predetermined as a correspondence relation between the temperature detection value and a correction value to correct the light detection value, and in the second processing,
a correction value corresponding to the current temperature detection value is determined in accordance with an approximate relation approximating a correspondence relation corresponding to the past temperature detection value and a correspondence relation corresponding to the current temperature detection value, and
the current corrected detection value is acquired by correcting the past light detection value by using the determined correction value.

8. The light--emitting apparatus according to claim 7, wherein
in the first processing,
a correction value corresponding to the current temperature detection value is determined in accordance with the correspondence relation corresponding to the current temperature detection value, and
the current corrected detection value is acquired by correcting the n light detection value by using the determined correction value.

9. The light-emitting apparatus according to claim 6, wherein
in the second processing, the past light detection value is inversely calculated based on the past temperature detection value and the past corrected detection value.

10. The light-emitting apparatus according to claim 1, wherein
a timing to execute the first processing and a timing to execute the second processing are predetermined.

11. The light-emitting apparatus according to claim 10, further comprising:
a control unit configured to control light emission of the light source unit; and
a determination unit configured to determine whether or not the light emitted from the light source unit is detectable, based on a light emission state of the light source unit, wherein
the correction unit
executes the first processing at the timing to executing the first processing if where the determination unit determines that the light emitted from the light source unit is detectable,
executes the second processing at the timing to execute the first processing if where the determination unit determines that the light emitted from the light source is not detectable, and executes the second processing at the timing to execute the second processing regardless of the determination result of the determination unit.

12. The light-emitting apparatus according to claim 1, further comprising,
a control unit configured to control light emission of the light source unit; and
a determination unit configured to determine whether or not the light emitted from the light source unit is detectable, based on a light emission state of the light source unit, wherein
the correction unit executes
the first processing if where the determination unit determines that the light emitted from the light source unit is detectable, and executes the second processing if where the determination unit determines that the light emitted from the light source unit is not detectable.

13. The light-emitting apparatus according to claim 11, wherein the determination unit determines that the light emitted from the light source unit is detectable if where one lighting period of the light source unit is not less than the threshold, and determines that the light emitted from the light source unit is not detectable if where the one lighting period of the light source unit is less than the threshold.

14. The light-emitting apparatus according to claim 1, comprising a plurality of light source units, wherein the processing by the optical sensor, the processing by the temperature sensor, and the processing by the correction unit are executed for each of the plurality of light source units.

15. A display apparatus, comprising:

the light-emitting apparatus according to claim 1; and a display unit configured to display an image by modulating light emitted from the light-emitting apparatus.

16. A method for controlling a light-emitting apparatus having:

a light source unit;

a control unit configured to control the light source unit emitting a light by controlling lighting period of the light source unit;

an optical sensor configured to acquire a light detection value corresponding to at least one of a brightness and a color of light emitted from the light source unit; and a temperature sensor disposed near the optical sensor, the method comprising:

a correction step of executing a first processing to acquire a current corrected detection value by correcting a current light detection value, based on a current temperature detection value from the temperature sensor if that a lighting period of the light source unit is equal to or more than a threshold, and a second processing to acquire a current corrected detection value, based on: 1) a past corrected detection value from the temperature sensor; 2) a past temperature detection value; and 3) the current temperature detection value from the temperature sensor if that the lighting period of the light source unit is less than the threshold.

17. A non-transitory computer readable medium that stores a program, wherein the program causes a computer to execute a method for controlling a light-emitting apparatus having:

a light source unit;

a control unit configured to control the light source unit emitting a light by controlling lighting period of the light source unit;

an optical sensor configured to acquire a light detection value corresponding to at least one of a brightness and a color of light emitted from the light source unit; and a temperature sensor disposed near the optical sensor, the method comprising:

a correction step of executing a first processing to acquire a current corrected detection value by correcting a current light detection value, based on a current temperature detection value from the temperature sensor if that a lighting period of the light source unit is equal to or more than a threshold and a second processing to acquire a current corrected detection value, based on: 1) at least one of past light detection value and a past corrected detection value; 2) a past temperature detection value from the temperature sensor; and 3) the current temperature detection value from the temperature sensor if that the lighting period of the light source unit is less than the threshold.

* * * * *